R. J. REISER.
TRANSMISSION MECHANISM.
APPLICATION FILED JULY 31, 1920.

1,423,454.

Patented July 18, 1922.

R. J. Reiser
INVENTOR

BY Victor J. Evans
ATTORNEY

WITNESS:

UNITED STATES PATENT OFFICE.

REYNOLD J. REISER, OF KENOSHA, WISCONSIN.

TRANSMISSION MECHANISM.

1,423,454.   Specification of Letters Patent.   Patented July 18, 1922.

Application filed July 31, 1920. Serial No. 400,298.

*To all whom it may concern:*

Be it known that I, REYNOLD J. REISER, a citizen of the United States, residing at Kenosha, in the county of Kenosha and State of Wisconsin, have invented new and useful Improvements in Transmission Mechanism, of which the following is a specification.

This invention relates to a transmission mechanism, and has for its primary object the construction of mechanism that will more efficiently transmit power and which will dispense with the use of gears or similar devices which in practice become mutilated due to inexperienced persons actuating the same.

An object of this invention is to provide fluid controlled devices for controlling speed transmitted from a drive shaft to a driven shaft, having the great advantage that the mechanism is practically noiseless in its operation.

Another feature of the invention is to provide mechanism that may be easily and accurately operated and which will give any ratio of speed and when at "high speed" will establish a direct drive between the prime mover and the device operated.

A feature of the invention is the arrangement of devices for controlling the flow of fluid, thereby regulating the pressure exerted by devices directly connected to the prime mover and devices connected to the mechanism to be driven.

With these and other objects in view the invention will be better understood from the following detailed description taken in connection with the accompanying drawing wherein.

Figure 1:
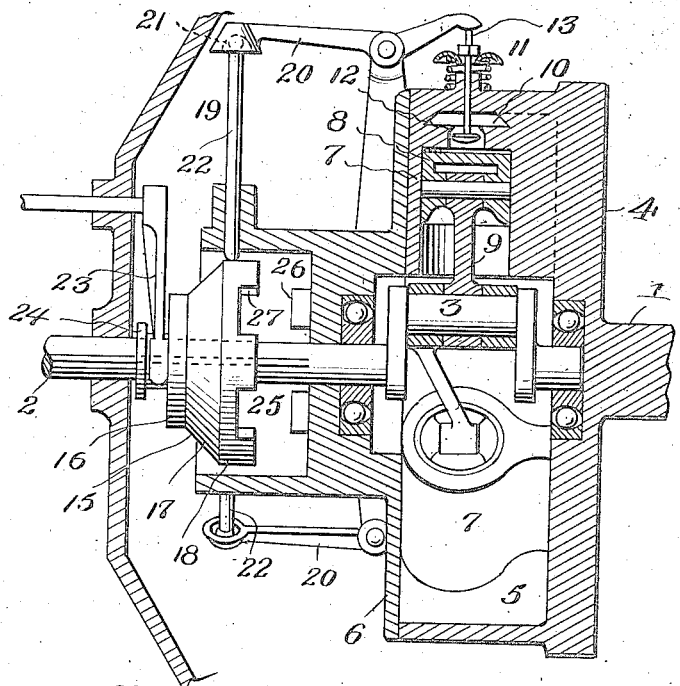
Fig. 1 is a sectional view of the mechanism.
Figure 2:
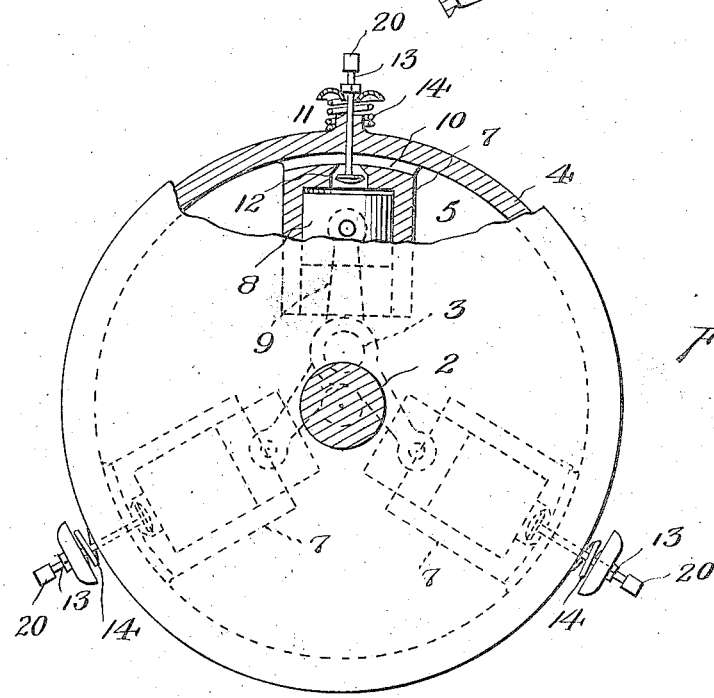
Fig. 2 is an elevation partly in section.

Again referring to the drawing illustrating one of the many constructions of my invention, numeral 1 designates the drive shaft and numeral 2 the driven shaft. It will be noted that the driven shaft is formed with a crank portion 3. The numeral 4 designates a fly wheel shown hollow in this particular instance to provide a fluid chamber 5 when the bearing plate 6 is attached thereto. Supported by the pulley within the chamber, are a plurality of cylinders 7 shown in this particular instance as 3 in number. At this point I wish to call attention to the fact that although I have illustrated the cylinders and fly wheel in a single unit, I wish it to be understood that the cylinders may be connected to the drive shaft 1 in other relations.

Working in each cylinder is a piston 8 connected by connecting rod 9 to the crank 3. Arranged in the head of each cylinder, is a port 10, establishing communication between each cylinder and the chamber, whereby the fluid can pass to and out of the cylinders according to the movement of the pistons. For the purpose of controlling the fluid for each port I provide the valve 11 which cooperates with the seat 12 and the position of this valve is manually controlled in a manner hereinafter described.

The valve stem 13 passes through the peripheral portion of the fly wheel and is engaged by the spring 14 so that the valve is normally held seated unless actuated by the mechanism hereinafter described.

Splined to the shaft 2 so as to have a slidable movement, is an actuator 15. This actuator is shaped to provide a "high-speed" ring portion 16 an inclined adjustable speed cam portion 17 and an "idle" ring portion 18.

The numeral 19 designates the valve operating mechanism for each cylinder. This mechanism includes the lever 20 pivotally supported by the bearing plate so that one end will engage the valve stem while the other end has a flexible connection 21 with a slidably mounted pin 22 that directly engages the actuator. The actuator is manually moved in any suitable manner by the fork 23 engaging collar 24 secured to the actuator. To complete the invention I provide the clutch 25, one set of teeth, 26, of which is secured to the bearing plate while the other set of teeth 27 is connected to the actuator so that when the shaft 2 is to be driven at full speed and the pin 22 engages ring 16, the clutch will be active for accomplishing a direct drive between the two shafts.

From the foregoing description taken in connection with the accompanying drawing it will be apparent that I provide mechanism that is positive in operation and which is practically noiseless and in which the parts co-operate in such a manner that they cannot become mutilated by being actuated by inexperienced operators. It can be readily seen that by shifting the actuator movement of the link mechanism allows the spring 14 to change the position of the valve for regulating the flow of fluid and thereby regulating the pressure between the cylinders and the pistons so as to regulate the power transmitted from the drive shaft to the driven shaft.

It is of course to be understood that the invention may be constructed in various other manners and the parts associated in other relations and, therefore, I do not desire to be limited in any manner except as set forth in the claims hereunto appended.

Having thus described my invention what I claim is:

1. In a transmission mechanism, a drive shaft, a driven shaft, cylinders connected to one of the shafts, pistons working in said cylinders and connected to the other shaft, valves adjustable for controlling the flow of a fluid to and from the cylinders, an actuator, a slidably actuated and linked mechanism operated by said actuator and controlling the position of said valves, said mechanism including a pivoted lever for each valve and a pin connected to the lever and engaging said actuator.

2. In a transmission mechanism, a drive shaft, a driven shaft, cylinders connected to one of the shafts, pistons working in said cylinders and connected to the other shaft, valves adjustable for controlling the flow of a fluid to and from the cylinders, an actuator, a slidably actuated and linked mechanism operated by said actuator and controlling the position of said valves, said mechanism including a pivoted lever for each valve, a pin connected to the lever and engaging said actuator, and a clutch arranged to be thrown into engagement upon said actuator moving a predetermined distance for directly connecting the shafts together.

In testimony whereof I affix my signature.

REYNOLD J. REISER.